United States Patent
Ko et al.

(10) Patent No.: US 10,128,504 B2
(45) Date of Patent: Nov. 13, 2018

(54) NEGATIVE ACTIVE MATERIAL FOR RECHARGEABLE LITHIUM BATTERY, AND RECHARGEABLE LITHIUM BATTERY INCLUDING SAME

(71) Applicant: SAMSUNG SDI CO., LTD., Yongin-si, Gyeonggi-do (KR)

(72) Inventors: Seongjae Ko, Yongin-si (KR); Jae Hou Nah, Yongin-si (KR); Ga-Young Jo, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 36 days.

(21) Appl. No.: 15/284,565

(22) Filed: Oct. 4, 2016

(65) Prior Publication Data

US 2017/0117546 A1    Apr. 27, 2017

(30) Foreign Application Priority Data

Oct. 27, 2015 (KR) ........................ 10-2015-0149641

(51) Int. Cl.
| | |
|---|---|
| *H01M 4/587* | (2010.01) |
| *H01M 4/583* | (2010.01) |
| *H01M 4/133* | (2010.01) |
| *H01M 10/0525* | (2010.01) |
| *H01M 4/02* | (2006.01) |

(52) U.S. Cl.
CPC ........... *H01M 4/587* (2013.01); *H01M 4/133* (2013.01); *H01M 4/583* (2013.01); *H01M 10/0525* (2013.01); *H01M 2004/027* (2013.01)

(58) Field of Classification Search
CPC ...... H01M 4/587; H01M 4/583; H01M 4/133; H01M 10/0525; H01M 2004/027
See application file for complete search history.

(56) References Cited

U.S. PATENT DOCUMENTS

| | | | |
|---|---|---|---|
| 2012/0148922 A1* | 6/2012 | Takahashi | H01M 4/583 429/231.8 |
| 2013/0065131 A1 | 3/2013 | Hwang et al. | |
| 2014/0080004 A1 | 3/2014 | Imaji et al. | |
| 2014/0178730 A1* | 6/2014 | Chigiri | H01M 4/587 429/94 |
| 2015/0251911 A1 | 9/2015 | Yamamoto et al. | |

FOREIGN PATENT DOCUMENTS

| | | |
|---|---|---|
| JP | 2014-103095 A | 6/2014 |
| KR | 10-2010-0120919 A | 11/2010 |
| KR | 10-2013-0124584 A | 11/2013 |
| WO | WO 2012/091515 A2 | 7/2012 |

* cited by examiner

*Primary Examiner* — Laura Weiner
(74) *Attorney, Agent, or Firm* — Lee & Morse, P.C.

(57) ABSTRACT

A negative active material for a rechargeable lithium battery, including crystalline carbon-based material particles, for which a maximum volume % in a graph of a particle size distribution on a volume basis is about 20 volume % or more.

6 Claims, 4 Drawing Sheets

NEGATIVE ACTIVE MATERIAL FOR RECHARGEABLE LITHIUM BATTERY, AND RECHARGEABLE LITHIUM BATTERY INCLUDING SAME

CROSS-REFERENCE TO RELATED APPLICATION

Korean Patent Application No. 10-2015-0149641, filed on Oct. 27, 2015, in the Korean Intellectual Property Office, and entitled: "Negative Active Material for Rechargeable Lithium Battery, and Rechargeable Lithium Battery Including Same," is incorporated by reference herein in its entirety.

BACKGROUND

1. Field

A negative active material for a rechargeable lithium battery and a rechargeable lithium battery including the same are disclosed.

2. Description of the Related Art

A rechargeable lithium battery may be a power source for a small portable electronic device. A rechargeable lithium battery may use an organic electrolyte solution, and may have twice or more high discharge voltage than that of a comparative battery using an alkali aqueous solution, and may have high energy density.

SUMMARY

Embodiments may be realized by providing a negative active material for a rechargeable lithium battery, including crystalline carbon-based material particles, for which a maximum height value of a peak in a graph of a particle size distribution on a volume basis is about 20 volume % or more.

The maximum height value of a peak in the graph of the particle size distribution on a volume basis may be about 20 volume % to about 40 volume %.

D50 (50% of a particle cumulative volume %) of the crystalline carbon-based material particle may be about 3 μm to about 40 μm.

D10 (10% of a particle cumulative volume %) of the crystalline carbon-based material particle may be about 1 μm to about 20 μm.

D90 (90% of a particle cumulative volume %) of the crystalline carbon-based material particle may be about 5 μm to about 80 μm.

The crystalline carbon-based material may include natural graphite, artificial graphite, or a combination thereof.

Embodiments may be realized by providing a rechargeable lithium battery, including a negative electrode including the disclosed negative active material; a positive electrode including a positive active material; and an electrolyte.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

Figure 1:
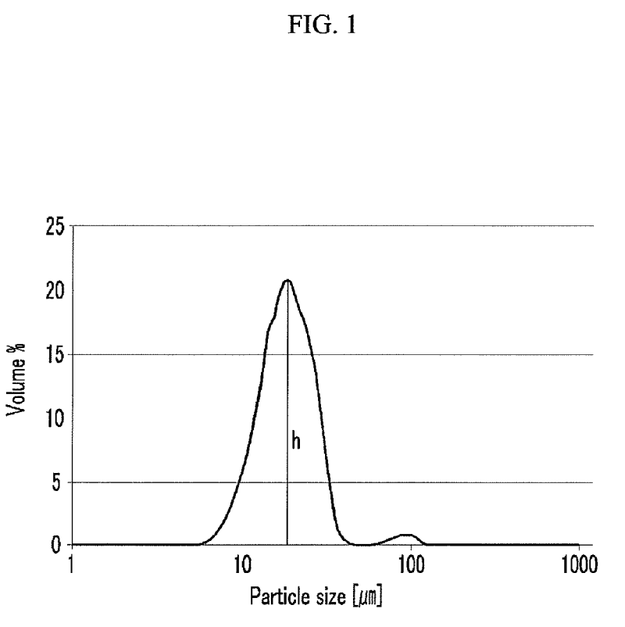
FIG. 1 illustrates a graph of the maximum height value of a peak in a particle size distribution on a volume basis.

A negative active material for a rechargeable lithium battery according to one embodiment may include crystalline carbon-based material particles. The maximum height value of a peak may be greater than or equal to about 20 volume %, for example, about 20 volume % to about 40 volume % in a graph illustrating a particle size distribution on a volume basis. In the graph of a particle size distribution on a volume basis, the maximum height value of a peak may be indicated as h, as shown in FIG. 1.

In the graph of a particle size distribution on a volume basis, greater than or equal to about 20 volume % of the maximum height value of a peak means that greater than or equal to about 20 volume % of particles have a similar size based on 100 volume % of the entire particles.

In the specification, D10, D50, and D90, respectively, correspond to a cumulative value in a cumulative particle size distribution on a volume basis. D10 indicates 10% of a particle cumulative volume %, D50 indicates 50% of a particle cumulative volume %, and D90 indicates 90% of a particle cumulative volume % in each particle diameter size.

In the present specification, the particle diameter size may be measured by a laser diffraction-type particle distribution analyzer. The particle diameter size indicates a particle size, for example, a particle diameter.

According to one embodiment, the negative active material may have greater than or equal to about 20 volume % of the maximum height value of a peak, e.g., the maximum volume %, in the particle size distribution on a volume basis, which means that greater than or equal to about 20% of particles have a similar particle size. The negative active material may have a sharp particle distribution, and when the negative active material has the sharp particle distribution, for example, the maximum height value of a peak of greater than or equal to about 20 volume, for example, ranging from about 20 volume % to about 40 volume % in the particle size distribution on a volume basis, sharp charge characteristics may be improved. When this active material is used to manufacture a negative electrode, active mass density may not only be improved, but high press property may also be maintained, manufacturing a high energy density rechargeable battery. The active mass density indicates density of a an active mass layer, for example, an active material layer formed by adding an active material, a binder and optionally, a conductive material to a solvent to prepare active material slurry, coating the slurry on a current collector, and drying it.

When the maximum height value of a peak is less than about 20 volume % in the particle size distribution on a volume basis, sharp charge characteristics may be deteriorated. When the maximum height value of a peak is greater than about 40 volume % in the particle size distribution on a volume basis, high density of active mass may be difficult to obtain. When the active material has too sharp a particle size distribution, filling density (tap density) of the active material may be too much deteriorated, and an active material layer may become thicker, while press property may be deteriorated as much, and a high energy density may not be realized. When the particle distribution is extremely sharp, press property deterioration may occur.

The crystalline carbon-based material particle may have D50 ranging from about 3 μm to about 40 μm. D10 may be in a range of about 1 μm to about 20 μm, and D90 may be in a range of about 5 μm to about 80 μm. When the negative active material has the maximum height value of a peak within the range and D50, D10, and D90, respectively, within the ranges in the particle size distribution on a volume basis, high-rate charge performance at a high energy density (high active mass) may be improved.

In one embodiment, the crystalline carbon-based material particles may have a particle diameter size ranging from about 1 μm to about 100 μm.

In one embodiment, the crystalline carbon-based material may be natural graphite, artificial graphite, or a combination thereof. When the carbon-based material is an amorphous carbon-based material such as, for example, hard carbon, the carbon-based material may have greater than or equal to about 20 volume % of the maximum height value of a peak in the particle size distribution on a volume basis, capacity and efficiency may be much deteriorated, and the carbon-based material may not be appropriate to manufacture a rapid-charging battery having a high energy density. Since an amorphous carbon-based material unlike the crystalline carbon-based material may secure press property only when it has a broad particle distribution, the amorphous carbon-based material having a sharp particle distribution may not be manufactured into an appropriate negative electrode.

The negative active material having these properties may be sieved and adjusted to have crystalline carbon-based material particles having about 20 volume % or more of the maximum height value of a peak in the particle size distribution on a volume basis. The sieving process may be performed in any appropriate method, for example, in an air-current classification method. The condition adjustment of the air-current classification method may be widely understood to those having an skill in a related art.

This negative active material according to one embodiment may provide a rechargeable lithium battery having excellent capacity, charge and discharge efficiency, and charge characteristics as well as high active mass density. For example, the negative active material according to one embodiment may be used to manufacture an electrode having high active mass density of greater than or equal to about 1.70 g/cc, for example, about 1.70 g/cc to about 1.85 g/cc, and may be usefully applied to a high energy density battery.

An embodiment may provide a rechargeable lithium battery including a negative electrode including the negative active material, a positive electrode including a positive active material and an electrolyte.

The negative electrode may include a current collector and a negative active material layer formed on the current collector.

The negative active material may be the negative active material according to one embodiment.

In the negative active material layer, the amount of the negative active material may be about 95 wt % to about 99 wt % based on the total weight of the negative active material layer.

In one embodiment, the negative active material layer may include a binder, and optionally a conductive material. In the negative active material layer, the amount of the binder may be about 1 wt % to about 5 wt % based on the total weight of the negative active material layer. When the negative active material layer further includes the conductive material, the negative active material layer may include about 90 wt % to about 98 wt % of the negative active material, about 1 wt % to about 5 wt % of the binder, and about 1 wt % to about 5 wt % of the conductive material.

The binder may improve binding properties of negative active material particles with one another and with a current collector. The binder may include a non-water-soluble binder, a water-soluble binder, or a combination thereof.

The non-water-soluble binder may include polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may include a rubber-based binder or a polymer resin binder. The rubber-based binder may be, for example, a styrene-butadiene rubber, an acrylated styrene-butadiene rubber (SBR), an acrylonitrile-butadiene rubber, an acrylic rubber, a butyl rubber, a fluorine rubber, or a combination thereof. The polymer resin binder may be, for example, polytetrafluoroethylene, polyethylene, polypropylene, ethylene-propylene copolymer, polyethylene oxide, polyvinylpyrrolidone, polyepichlorohydrine, polyphosphazene, polyacrylonitrile, polystyrene, an ethylene-propylene-diene copolymer, a polyvinylpyridine, chlorosulfonated polyethylene, a latex, a polyester resin, an acrylic resin, a phenol resin, an epoxy resin, polyvinyl alcohol, or a combination thereof.

When the water-soluble binder is used as a negative electrode binder, a cellulose-based compound may further be used to provide viscosity. The cellulose-based compound may include one or more of carboxylmethyl cellulose, hydroxypropylmethyl cellulose, methyl cellulose, or alkali metal salts thereof. The alkali metal may be Na, K, or Li. The cellulose-based compound may be included in an amount of about 0.1 parts to about 3 parts by weight based on 100 parts by weight of the negative active material.

The conductive material may be included to provide electrode conductivity. Any electrically conductive material may be used as a conductive material unless it causes a chemical change. Examples of the conductive material may include a carbon-based material such as, for example, natural graphite, artificial graphite, carbon black, acetylene black, ketjen black, and a carbon fiber; a metal-based material of metal powder or metal fiber including, for example, copper, nickel, aluminum, and silver; a conductive polymer such as a polyphenylene derivative; and a mixture thereof.

The current collector may include, for example, a copper foil, a nickel foil, a stainless steel foil, a titanium foil, a nickel foam, a copper foam, a polymer substrate coated with a conductive metal, or a combination thereof.

The positive electrode may include a positive current collector and a positive active material layer formed on the positive current collector. The positive active material may include lithiated intercalation compounds that reversibly intercalate and deintercalate lithium ions. For example, a composite oxide of obalt, manganese, nickel, or a combination thereof, and lithium may be used. Examples may be compounds represented by the following chemical formulae:

Li$_a$A$_{1-b}$X$_b$D$_2$ (0.90≤a≤1.8, 0≤b≤0.5); Li$_a$A$_{1-b}$X$_b$O$_{2-c}$D$_c$ (0.90≤a≤1.8, 0≤b≤0.5, 0≤c≤0.05); Li$_a$E$_{1-b}$X$_b$O$_{2-c}$D$_c$ (0≤b≤0.5, 0≤c≤0.05); Li$_a$E$_{2-b}$X$_b$O$_{4-c}$D$_c$ (0≤b≤0.5, 0≤c≤0.05); Li$_a$Ni$_{1-b-c}$Co$_b$X$_c$D$_\alpha$ (0.90≤a≤1.8, 0≤b≤0.5, 0≤c≤0.5, 0<α≤2); Li$_a$Ni$_{1-b-c}$Co$_b$X$_c$O$_{2-\alpha}$T$_\alpha$ (0.90≤a≤1.8, 0≤b≤0.5, 0≤c≤0.05, 0<α<2); Li$_a$Ni$_{1-b-c}$Co$_b$X$_c$O$_{2-\alpha}$T$_2$ (0.90≤a≤1.8, 0≤b≤0.5, 0≤c≤0.05, 0<α<2); Li$_a$Ni$_{1-b-c}$Mn$_b$X$_c$D$_\alpha$ (0.90≤a≤1.8, 0≤b≤0.5, 0≤c≤0.05, 0<α≤2); Li$_a$Ni$_{1-b-c}$Mn$_b$X$_c$O$_{2-\alpha}$T$_\alpha$ (0.90≤a≤1.8, 0≤b≤0.5, 0≤c≤0.05, 0<α<2); Li$_a$Ni$_{1-b-c}$Mn$_b$X$_c$O$_{2-\alpha}$T$_2$ (0.90≤a≤1.8, 0≤b≤0.5, 0≤c≤0.05, 0<α<2); Li$_a$Ni$_b$E$_c$G$_d$O$_2$ (0.90≤a≤1.8, 0≤b≤0.9, 0≤c≤0.5, 0.001≤d≤0.1); Li$_a$Ni$_b$Co$_c$Mn$_d$G$_e$O$_2$ (0.90≤a≤1.8, 0≤b≤0.9, 0≤c≤0.5, 0≤d≤0.5, 0.001≤e≤0.1); Li$_a$NiG$_b$O$_2$ (0.90≤a≤1.8, 0.001≤b≤0.1); Li$_a$CoG$_b$O$_2$ (0.90≤a≤1.8, 0.001≤b≤0.1); Li$_a$Mn$_{1-b}$G$_b$O$_2$ (0.90≤a≤1.8, 0.001≤b≤0.1); Li$_a$Mn$_2$G$_b$O$_4$ (0.90≤a≤1.8, 0.001≤b≤0.1); Li$_a$Mn$_{1-g}$G$_g$PO$_4$ (0.90≤a≤1.8, 0≤g≤0.5); QO$_2$; QS$_2$; LiQS$_2$; V$_2$O$_5$; LiV$_2$O$_5$; LiZO$_2$; LiNiVO$_4$; Li$_{(3-f)}$J$_2$(PO$_4$)$_3$ (0≤f≤2); Li$_{(3-f)}$Fe$_2$(PO$_4$)$_3$ (0≤f≤2); and Li$_a$FePO$_4$ (0.90≤a≤1.8)

In the chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu. and a combination thereof.

The compounds may have a coating layer on the surface, or may be mixed with another compound having a coating layer. The coating layer may include one or more coating element compound, for example, an oxide of a coating element, a hydroxide of a coating element, an oxyhydroxide of a coating element, an oxycarbonate of a coating element, or a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a positive active material by using these elements in the compound. For example, the method may include a coating method such as, for example spray coating or dipping.

In the positive electrode, an amount of the positive active material may be about 90 wt % to about 98 wt % based on the total weight of the positive active material layer.

In one embodiment, the positive active material layer may further include a binder and a conductive material. The binder and conductive material may be respectively included in an amount ranging from about 1 wt % to about 5 wt % based on the total weight of the positive active material layer.

The binder may improve binding properties of positive active material particles with one another and with a current collector. Examples of the binder may include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, styrene-butadiene rubber, an acrylated styrene-butadiene rubber, an epoxy resin, and nylon.

The conductive material may improve conductivity of an electrode. Any electrically conductive material may be used as a conductive material, unless it causes a chemical change. Examples of the conductive material may include a carbon-based material such as, for example, natural graphite, artificial graphite, carbon black, acetylene black, ketjen black, and a carbon fiber; a metal-based material such as, for example a metal powder or a metal fiber of, for example, copper, nickel, aluminum, and silver; a conductive polymer such as, for example, a polyphenylene derivative; and a mixture thereof.

The current collector may be, for example, Al.

The electrolyte may include a non-aqueous organic solvent and a lithium salt.

The non-aqueous organic solvent may serve as a medium for transmitting ions taking part in the electrochemical reaction of a battery.

The non-aqueous organic solvent may be a carbonate-based, ester-based, ether-based, ketone-based, alcohol-based, or aprotic solvent.

The carbonate-based solvent may include, for example, dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), or butylene carbonate (BC). The ester-based solvent may be, for example, methylacetate, ethylacetate, n-propylacetate, dimethylacetate, methylpropionate, ethylpropionate, γ-butyrolactone, decanolide, valerolactone, mevalonolactone, or caprolactone. The ether-based solvent may be, for example, dibutylether, tetraglyme, diglyme, dimethoxyethane, 2-methyltetrahydrofuran, or tetrahydrofuran. The ketone-based solvent may be, for example, cyclohexanone. The alcohol-based solvent may be, for example, ethanol or isopropyl alcohol, and the aprotic solvent may be, for example, a nitrile such as, for example, R—CN (wherein R is a C2 to C20 linear, branched, or ring structured hydrocarbon group, or includes double bond, an aromatic ring or an ether bond), an amide such as dimethylformamide, or a dioxolane such as, for example, 1,3-dioxolane, sulfolanes.

The organic solvent may be used singularly or in a mixture. When the organic solvent is used in a mixture, the mixture ratio may be controlled in accordance with a desirable battery performance.

The carbonate-based solvent may include a mixture of a cyclic carbonate and a linear carbonate. The cyclic carbonate and linear carbonate may be mixed together in a volume ratio of about 1:1 to about 1:9. When the mixture is used as an electrolyte, the electrolyte may provide enhanced performance.

The organic solvent may further include an aromatic hydrocarbon-based organic solvent in addition to the carbonate based solvent. The carbonate-based solvent and aromatic hydrocarbon-based solvent may be mixed together in a volume ratio of about 1:1 to about 30:1.

The aromatic hydrocarbon-based organic solvent may be an aromatic hydrocarbon-based compound represented by Chemical Formula 1.

[Chemical Formula 1]

In Chemical Formula 1, $R^1$ to $R^6$ are the same or different and are hydrogen, a halogen, a C1 to C10 alkyl group, a haloalkyl group, or a combination thereof.

Examples of the aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate or an ethylene carbonate-based compound represented by Chemical Formula 2 to improve cycle life.

[Chemical Formula 2]

In Chemical Formula 2, $R_7$ and $R_8$ are the same or different and may be each independently hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group, and $R_7$ and $R_8$ are not simultaneously hydrogen.

Examples of the ethylene carbonate-based compound may include difluoro ethylenecarbonate, chloroethylene carbonate, dichloroethylene carbonate, bromoethylene carbonate, dibromoethylene carbonate, nitroethylene carbonate, cyanoethylene carbonate, and fluoroethylene carbonate. The amount of the additive for improving cycle life may be flexibly used within an appropriate range.

The lithium salt may be dissolved in an organic solvent, may supply a battery with lithium ions, may basically operate the rechargeable lithium battery, and may improve transportation of the lithium ions between positive and negative electrodes. Examples of the lithium salt may include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers, for example an integer ranging from 1 to 20), LiCl, LiI, and $LiB(C_2O_4)_2$ (lithium bis(oxalato) borate; LiBOB). The lithium salt may be used in a concentration ranging from about 0.1 M to about 2.0 M. When the lithium salt is included at the above concentration range, an electrolyte may have excellent performance and lithium ion mobility due to, for example, optimal electrolyte conductivity and viscosity.

The rechargeable lithium battery may further include a separator between the negative electrode and the positive electrode, depending on a kind of the battery. Examples of a suitable separator material may include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Figure 2:
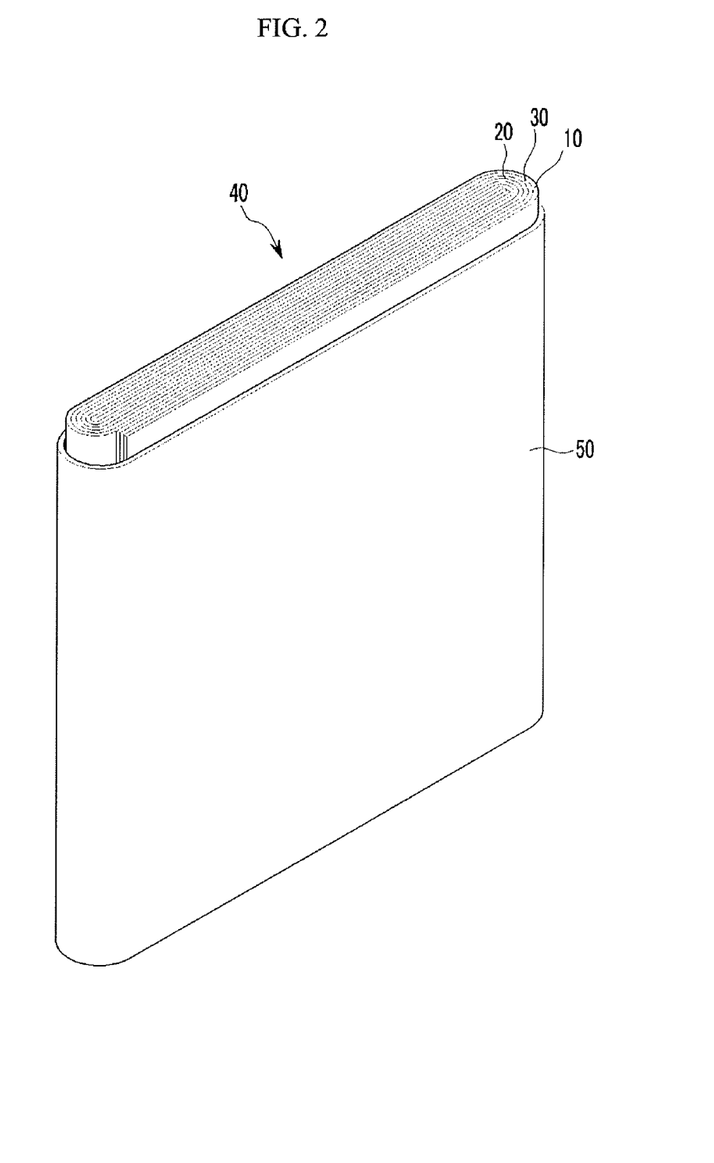
FIG. 2 illustrates a schematic view of a rechargeable lithium battery according to one embodiment.

FIG. 2 illustrates an exploded perspective view of a rechargeable lithium battery according to one embodiment. The rechargeable lithium battery according to one embodiment is illustrated to have, for example, a prismatic shape. In an embodiment, the rechargeable lithium battery may have various shapes such as, for example, a cylinder or a pouch.

Referring to FIG. 2, a rechargeable lithium battery according to one embodiment may include an electrode assembly 40 formed by placing a separator 30 between a positive electrode 10 and a negative electrode 20 and winding the same, and the electrode assembly 40 in a case 50. The electrolyte solution may be impregnated in the positive electrode 10, the negative electrode 20, and the separator 30.

The following Example and Comparative Examples are provided in order to highlight characteristics of one or more embodiments, but it will be understood that the Example and Comparative Examples are not to be construed as limiting the scope of the embodiments, nor are the Comparative Examples to be construed as being outside the scope of the embodiments. Further, it will be understood that the embodiments are not limited to the particular details described in the Example and Comparative Examples.

Example 1

Artificial graphite was crushed and then, air-current classified with an air-current classifier. After removing a micro powder having a size of less than or equal to about 5 μm from the crushed artificial graphite powder through the air-current classification process, the obtained powder was sieved with a 250 mesh (US Standard), preparing a negative active material having a particle distribution shown in Table 1.

Comparative Example 1

A negative active material having a particle distribution shown in Table 1 was prepared by crushing artificial graphite and then, sieving the crushed powder with a 150 mesh (US Standard).

Reference Example 1

A negative active material having a particle distribution shown in Table 1 was prepared by crushing artificial graphite, removing a micro powder having a size of less than or equal to about 10 μm, and then, sieving the obtained powder with a 300 mesh (US Standard).

Comparative Example 2

A negative active material having a particle distribution shown in Table 1 was prepared according to the same method as Example 1 except for using hard carbon instead of the artificial graphite.

Comparative Example 3

A negative active material having a particle distribution shown in Table 1 was prepared according to the same method as Comparative Example 1 except for using hard carbon instead of the artificial graphite.

Measurement of Particle Size Distribution on Volume Basis

The particle diameter distribution of each negative active material according to Example 1, Reference Example 1, and Comparative Examples 1 to 3 on a volume basis was measured by using a laser diffraction type particle size analyzer (SALD-2100, Shimadzu Corp., Japan). The measurement was performed by dispersing the active material into ethanol, and a refractive index condition was i2.00-0.00. The obtained particle size distribution on a volume basis was provided in FIGS. 3 and 4. D10, D50, and D90 calculated based on the graph were provided in Table 1.

Measurement of Pellet Density

Figure 4:
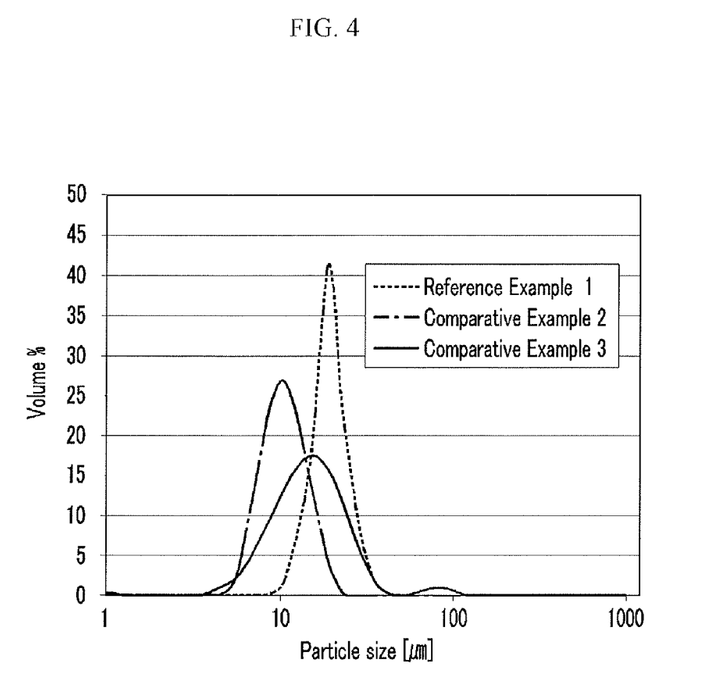
FIG. 4 illustrates a graph of the volume % of each negative active material according to Reference Example 1 and Comparative Examples 2 to 3 depending on a particle diameter size.

The negative active materials according to Example 1, Reference Example 1, and Comparative Examples 1 to 3 were respectively manufactured into each pellet by applying a pressure provided in Table 1. The pellet was manufactured by putting 1.0 g of each negative active material in a mold and maintaining it under the pressure provided in Table 1 for 30 seconds. The density of the pellet was measured, and the results are provided in Table 1.

the particle size distribution on a volume basis, but the active material according to Comparative Example 1 showed about 17 volume %. As shown in FIG. 4, the active materials according to Reference Example 1 and Comparative Examples 2 and 3 respectively showed about 42 volume %, 27 volume %, and 17 volume % of a maximum height value of a peak in the particle size distribution on a volume basis.

Measurement of Cell Characteristics 97.5 wt % of each negative active material according to Example 1, Reference Example 1, and Comparative Examples 1 to 3, 1.0 wt % of carboxylmethyl cellulose, and 1.5 wt % of styrene butadiene rubber were mixed in water as a solvent, preparing negative active material slurry.

The negative active material slurry was coated on an 8 µm-thick Cu foil and pressed to form an active mass layer on the Cu foil, manufacturing a negative electrode. The negative electrode was put in a vacuum chamber at 145° C. for 6 hours to evaporate moisture. The loading level (the amount of an active material per unit area) and active mass density of the negative electrode were measured, and the results are provided in Table 2.

TABLE 1

| Negative active material | Particle distribution (µm) | | | Pellet density (g/cc) | | |
|---|---|---|---|---|---|---|
| | D10 | D50 | D90 | 1 ton | 1.5 ton | 2 ton |
| Comparative Example 1 | artificial graphite | 7.4 | 16.6 | 31.1 | 1.52 | 1.65 | 1.72 |
| Reference Example 1 | artificial graphite | 13.3 | 16.3 | 21.2 | 1.46 | 1.57 | 1.64 |
| Example 1 | artificial graphite | 10.3 | 16.3 | 25.0 | 1.62 | 1.71 | 1.79 |
| Comparative Example 2 | hard carbon | 6.4 | 9.4 | 14.1 | 1.36 | 1.51 | 1.64 |
| Comparative Example 3 | hard carbon | 7.0 | 11.9 | 20.2 | 1.36 | 1.53 | 1.64 |

As shown in Table 1, the active material according to Example 1 had a particle having a diameter of less than or equal to about 10 µm in an amount of about 10 volume % based on 100 volume % of the active material, while the active material according to Comparative Example 1 had a particle having a diameter of less than or equal to about 7 µm in an amount of about 10 volume % based on 100 volume % of the active material. The active material according to Reference Example 1 had about 10 volume % of a particle having a diameter of less than or equal to about 13.3 µm based on 100 volume % of the active material, the active material according to Comparative Example 2 had about 10 volume % of a particle having a diameter of less than or equal to about 6.4 µm based on 100 volume % of the active material, and the active material according to Comparative Example 3 had about 10 volume % of a particle having a diameter of less than or equal to about 7.0 µm based on 100 volume % of the active material.

Furthermore, as shown in Table 1, the negative active material of Example 1 showed higher pellet density than those of the negative active materials of Reference Example 1 and Comparative Examples 1 to 3, and may be manufactured into a negative electrode having high active mass density, for example, a high energy density battery.

Figure 3:
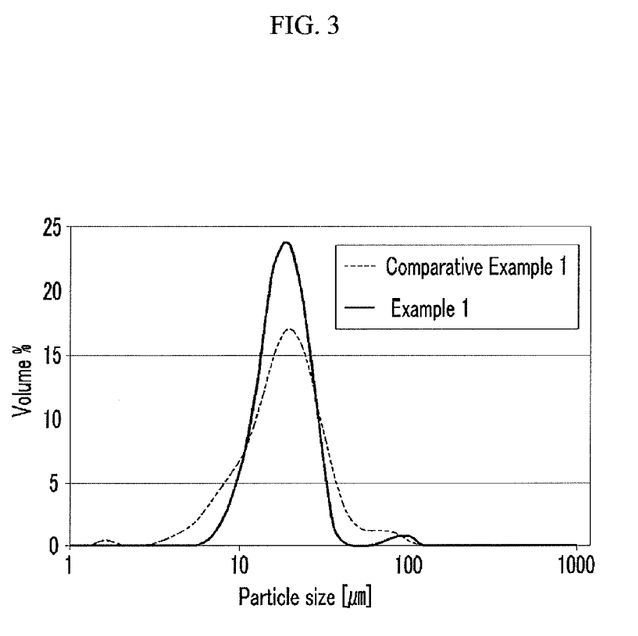
FIG. 3 illustrates a graph of the volume % of each negative active material according to Example 1 and Comparative Example 1 depending on a particle diameter size.

FIG. 3 shows particle size distribution of each active material according to Example 1 and Comparative Example 1 on a volume basis, and FIG. 4 shows particle size distribution of each active material according to Reference Example 1 and Comparative Examples 2 and 3. As shown in FIG. 3, the active material according to Example 1 showed about 25 volume % of a maximum height value of a peak in

TABLE 2

| | Loading level (L/L, g/cm²) | Active mass density (g/cc) |
|---|---|---|
| Comparative Example 1 | 6.7 | 1.6 |
| Reference Example 1 | 6.7 | 1.5 |
| Example 1 | 6.7 | 1.7 |
| Comparative Example 2 | 6.7 | 1.4 |
| Comparative Example 3 | 6.7 | 1.6 |

As shown in Table 2, each negative electrode manufactured by respectively using the negative active materials according to Example 1, Reference Example 1, and Comparative Examples 1 to 3 had the same loading level, but the negative electrode manufactured by using the negative active material according to Example 1 showed higher active mass density than those of the negative electrodes manufactured by using the negative active material according to Reference Example 1 and Comparative Examples 1 to 3.

As shown in Table 2, the negative electrodes according to Reference Example 1 and Comparative Example 2 showed low active mass density of 1.5 g/cc and 1.4 g/cc, and might not be appropriately applied to a high energy density battery, and hereinafter, a half-cell experiment was not performed. When a negative active material using hard carbon showed a sharp particle distribution, there was very low active mass density, which worked as a critical drawback in manufacturing a battery for a high energy density.

The negative electrodes according to Example 1 and Comparative Examples 1 and 3 were used along with a lithium metal counter electrode and an electrolyte, manufacturing each half cell in a common process. The electrolyte was prepared by mixing ethylene carbonate and ethylmethyl carbonate to obtain a non-aqueous organic solvent (3:7 of a volume ratio) and dissolving 1.0 M $LiPF_6$ therein.

Each manufactured half-cell was 0.1 C charged and discharged, and its charge and discharge capacity was measured. The obtained discharge capacity results are provided in Table 3, and charge and discharge efficiency of each half-cell (discharge capacity/charge capacity %) was measured, and the results are provided in Table 3.

The charge characteristics of the manufactured half-cell was obtained by charging CC (constant current) and CV (Constant voltage) at 0.2 C and discharging at 0.2 C for once; charging CC (constant current) charged at 0.5 C and discharging at 0.2 C for once; charging CC (constant current) at 1 C and discharging at 0.2 C for once; and charging CC (constant current) at 2 C and discharging at 0.2 C for once. The charge was performed by cutting off the CC (constant current) at 10 mV and the CV (Constant voltage) after 15 hours, and the discharge was performed under a cut-off condition of 1.5 V. The charge characteristics at each C-rate were provided in Table 3. The charge characteristics were obtained as a ratio of 0.5 C CC charge capacity relative to 0.2 C CC-CV charge capacity, 1 C CC charge capacity relative to 0.2 C CC-CV charge capacity, and 2 C CC charge capacity relative to 0.2 C CC-CV charge capacity.

TABLE 3

| | Capacity (mAh/g) | Efficiency (%) | Charge characteristics (%) | | |
|---|---|---|---|---|---|
| | | | 0.5 C/0.2 C | 1 C/0.2 C | 2 C/0.2 C |
| Comparative Example 1 | 360 | 88.0 | 91 | 66 | 28 |
| Example 1 | 365 | 89.5 | 92 | 72 | 36 |
| Comparative Example 3 | 350 | 85.1 | 86 | 58 | 25 |

As shown in Table 3, a battery cell manufactured by using the negative active material according to Example 1 showed excellent capacity and efficiency and excellent high-rate charge and discharge characteristics despite high active mass density of 1.7 g/cc. Particularly, Example 1 showed excellent high-rate charge characteristics compared with Comparative Example 1.

Comparative Example 3 showed excellent active mass density but lower efficiency and high-rate charge characteristics than Example 1 and Comparative Example 1 as shown in Table 2.

By way of summation and review, as for positive active materials of a rechargeable lithium battery, a lithium-transition metal oxide having a structure being capable of intercalating lithium ions, such as, for example, $LiCoO_2$, $LiMn_2O_4$, and $LiNi_{1-x}Co_xO_2$ (0<x<1), may be used.

As for negative active materials, various carbon-based materials such as artificial graphite, natural graphite, and hard carbon that may intercalate and deintercalate may be used. In order to obtain high capacity, silicon-based or tin-based non-carbon-based negative active materials may be used.

One embodiment may provide a negative active material for a rechargeable lithium battery being capable of improving high rate charge, and being capable of providing a high energy density, high density of active mass.

An embodiment may provide a rechargeable lithium battery including the negative active material. The negative active material for a rechargeable lithium battery according to one embodiment may be capable of improving high rate charge, and may provide a negative electrode for a rechargeable lithium battery having a high energy density and a high density of active mass.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A negative active material for a rechargeable lithium battery, comprising:
   crystalline carbon-based material particles, for which a maximum volume % in a graph of a particle size distribution on a volume basis is about 20 volume % to about 40%.

2. The negative active material as claimed in claim 1, wherein D50 of the crystalline carbon-based material particle is about 3 μm to about 40 μm.

3. The negative active material as claimed in claim 1, wherein D10 of the crystalline carbon-based material particle is about 1 μm to about 20 μm.

4. The negative active material as claimed in claim 1, wherein D90 of the crystalline carbon-based material particle is about 5 μm to about 80 μm.

5. The negative active material as claimed in claim 1, wherein the crystalline carbon-based material includes natural graphite, artificial graphite, or a combination thereof.

6. A rechargeable lithium battery, comprising:
   a negative electrode including the negative active material as claimed in claim 1;
   a positive electrode including a positive active material; and
   an electrolyte.

* * * * *